US006535376B2

(12) United States Patent
Fujita et al.

(10) Patent No.: US 6,535,376 B2
(45) Date of Patent: Mar. 18, 2003

(54) WRIST-CARRIED INFORMATION DEVICE

(75) Inventors: Kazuhiro Fujita, Chiba (JP); Jun Hirotomi, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/933,860

(22) Filed: Aug. 20, 2001

(65) Prior Publication Data

US 2002/0025056 A1 Feb. 28, 2002

(30) Foreign Application Priority Data

Aug. 23, 2000 (JP) ....................................... 2000-252510
Aug. 9, 2001 (JP) ....................................... 2001-241828

(51) Int. Cl.$^{7}$ ................................................ H02B 1/26

(52) U.S. Cl. ...................... 361/625; 368/281; 368/282; 343/718

(58) Field of Search ................................ 361/600, 601, 361/625; 368/281, 282; 343/718; 340/7.63

(56) References Cited

U.S. PATENT DOCUMENTS 4,690,567 A * 9/1987 Rebeaud ..................... 368/203
5,020,039 A * 5/1991 Yokote ....................... 224/165
5,168,281 A * 12/1992 Tokunaga ................... 343/718
5,179,733 A * 1/1993 Matsui ....................... 368/282
5,260,915 A * 11/1993 Houlihan .................... 224/165
5,499,292 A * 3/1996 Blonder et al. .......... 379/433.1
5,986,566 A * 11/1999 Yamamori ................. 340/7.63
6,233,203 B1 * 5/2001 Kawata ....................... 368/10
6,350,055 B1 * 2/2002 Barras ........................ 368/276

* cited by examiner

*Primary Examiner*—Boris Chervinsky
(74) *Attorney, Agent, or Firm*—Adams & Wilks

(57) ABSTRACT

An information device to be worn on the wrist of a user has a case, a circuit block disposed in the case, and a first electrode terminal disposed in the case and electrically connected to the circuit block. A band is pivotally connected to the case for undergoing pivotal movement within a range of angular positions relative to the case. A second electrode terminal is disposed in the band for contacting the first electrode terminal in accordance with a relative angular position between the band and the case.

23 Claims, 8 Drawing Sheets

WRIST-CARRIED INFORMATION DEVICE

BACKGROUND OF THE INVENTION

1. Field of the Invention

The present invention relates to a wrist-carried information device having a structure for easy manipulation of attaching and detaching the device, and a connection structure for connecting a microphone/speaker thereto.

2. Description of the Related Art

Among conventional wrist-carried information devices, there is one equipped with a microphone output on a wrist band portion (see Japanese Patent Application Laid-Open No. Hei 11-177663). Further, another example is one in which a microphone storage portion is provided for storing a microphone, and the microphone storage portion is provided to the band (see Japanese Utility Model Registration No. 3059555). The connection structure of the microphone and the circuit is depicted in partial cross-sectional view of the band connection structure of FIG. 8. According to this wrist-carried information device, a lead line 8 is buried into the band 6. One tip of the lead line 8 is connected to a microphone 7. The microphone 7 is also built into the band 6. Further, the other tip of the lead line 8 is connected to an electrode terminal A connected to a case 1. The electrode terminal A presses on and connects with a conductive spring 5 which is connected to a circuit block 4.

In this way, there is known a wrist-carried information device equipped with a wrist-carried information device main body and band, and in which the band portion has a microphone and microphone output transmission means.

In the conventional wrist-carried information device shown in FIG. 8, the circuit in the main body of the wrist-carried information device and the microphone provided to the band portion are constantly electrically conductive. Thus sound is constantly inputted to the microphone, and the output thereof is transmitted to the circuit. Because of this, there was a problem that when the wrist-carried information device is removed from the wrist, the sound generated upon removing or attaching the device is inputted, for example. In other words, noise is picked up.

Further, the lead line and the electrode terminal A are constantly connected; therefore, there was a problem that a load is placed on the connection at the time when the band is put on or removed, so there was a risk of the lead line being broken.

Additionally, at the time when a signal is received the wrist-carried information device is removed from the wrist for use; therefore, there is a demand for greater ease of removal from the wrist.

SUMMARY OF THE INVENTION

The present invention is a wrist-carried information device having: a case with a built-in circuit block; a band for holding the case in a rotatable fashion, and comprising an extruding portion which contacts the case across the breadth of its rotation; a band spring for applying force to the band so as to open the band up to a predetermined angle; an electrode terminal A fixed to the case so as to perform conduction with the circuit block, be exposed from the band in part, and make contact at this exposed part with the extruding portion of the band; and an electrode terminal B fixed to the extruding portion of the band in such a way that it performs conduction with the electrode terminal provided to the band, a part thereof is exposed from the extruding portion of the band, and when in the state of the band being opened up to the predetermined angle by means of the band spring the exposed part makes contact with the exposed part of the electrode terminal A.

By attaching and detaching the wrist-carried information device to and from the wrist, the connection state of the electrode terminal A and the electrode terminal B can be switched.

The construction is of a microphone output and a speaker output transmission means such that when the wrist-carried information device is detached from the wrist the electrode terminal A provided to the main body case and the electrode terminal B provided to the band connect together with each other, and when the wrist-carried information device is attached to the wrist, the connection between the electrode terminal A provided to the main body case and the electrode terminal B provided to the band is disengaged.

With this construction, the attachment and detachment of the wrist-carried information device is performed by means of a combination of the entering and exiting of the electrode terminal A producing a click sensation upon the attaching and detaching manipulation, and a band spring which applies force in the direction to detach the band.

Further, according to the present invention, with the construction described above, the wrist-carried information device is constructed to include a packing provided to the electrode terminal A in order to achieve greater water resistance of the main body, and a packing is also provided to the electrode terminal B so as to produce water resistance.

DETAILED DESCRIPTION OF THE PREFERRED EMBODIMENTS

Figure 1:
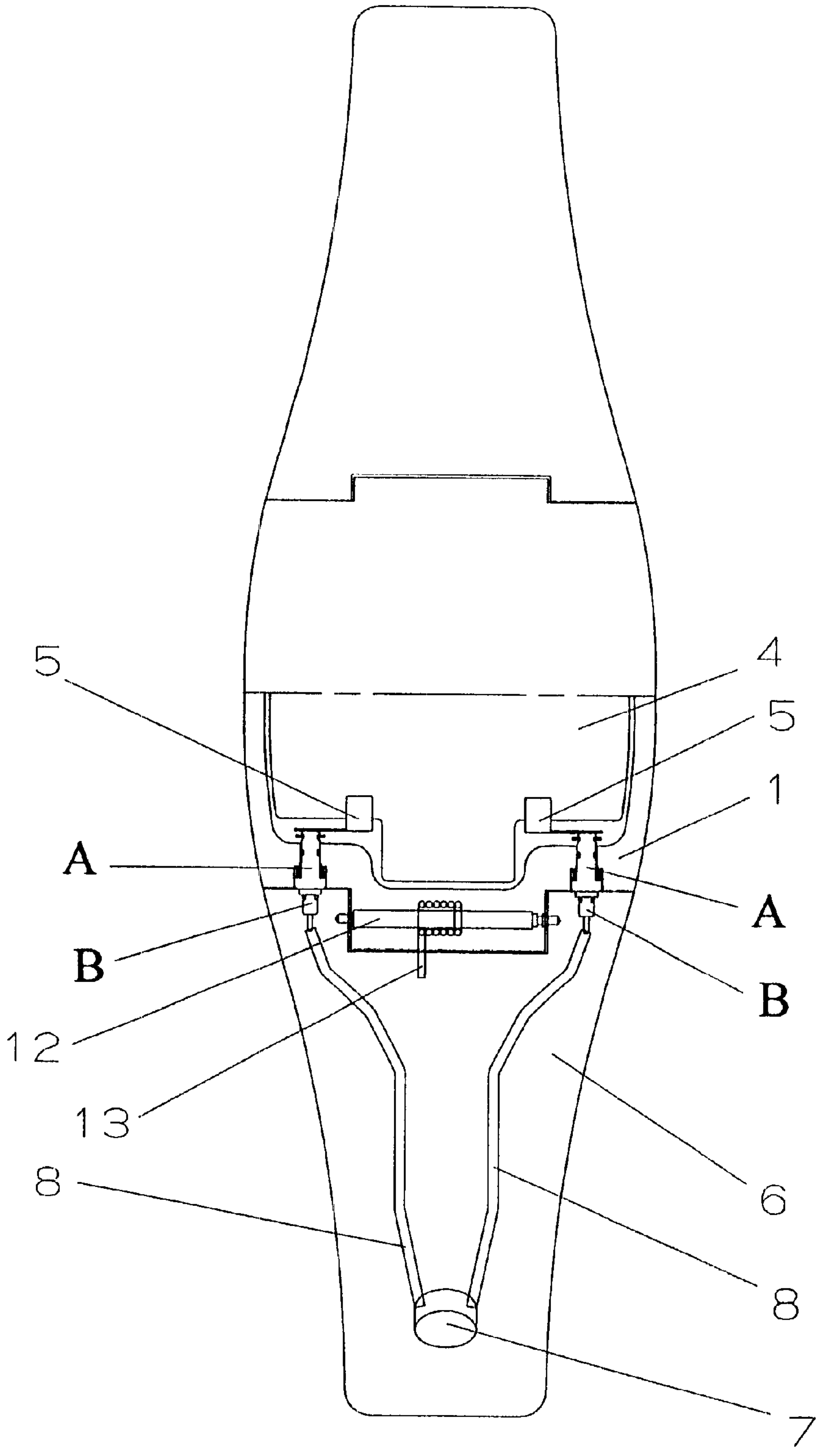
FIG. 1 shows a wrist-carried information device according to an Embodiment of the present invention, and is a partial transparent plan view depicting a state detached from the wrist.

Hereinafter, specific explanation will be made of the present invention based on the embodiments depicted in the drawings. FIG. 1 is a partial transparent plan view (i.e., on the 6 o'clock side) of a wrist-carried information device according to an Embodiment of the present invention. Reference numeral 1 is a case, and reference numeral 6 is a band. On the 6 o'clock side of the case 1 (i.e., the side closer to the body when the wrist-carried information device is being worn on the wrist) and on the 12 o'clock side (i.e., the side farther from the body when the wrist-carried information device is being worn on the wrist) there are holes passing through to the other side which are for inserting a spring bar 12. Meanwhile, on the band 6 there is a hole for the spring bar 12 to engage with. When the spring bar 12 is inserted into the case 1 and the tip of the spring bar 12 is made to engage with the band 6, the band 6 can be attached to the case 1 in a rotatable fashion.

Further, a coil-shaped band spring 13 is inserted around the outside of the spring bar 12, and the band 6 and the case 1 are fixed to the tip of the band spring 13. The band spring 13 is set in such a way that it applies force in the direction to remove the band 6. By setting the band spring 13 in this way it becomes easy to remove the band 6 from the wrist. The spring strength of the band spring 13 is set when the wrist-carried information device is removed from and attached to the wrist, and this spring strength is balanced by being set weak against a sideways pressure being applied to the band which is constantly making contact with the head of an electrode terminal A.

A circuit block 4 for processing the signal from the microphone 7 is fixed to the case 1 by means of a screw or the like. The conductive spring 5 is connected to the circuit block 4 in a way so as to be capable of conduction. The conductive spring 5 possesses spring qualities, and when it is connected to the electrode terminal A it is arranged in a way such that it can definitely achieve contact pressure. The electrode terminal A is fixed to the case 1 in such a way that a part thereof is exposed from the case 1. Further, it is also possible to provide packing in the space between the electrode terminal A and the case 1 so as to achieve water resistance. The electrode terminal A is fixed at a position such that when the band is rotated an extrusion 6*b* of the band 6 can make contact with the case 1.

A microphone 7 is buried within the band 6. The microphone 7 is connected to one tip of a lead line 8. The lead line 8 is also buried inside the band 6. The other tip of the lead line 8 is connected to an electrode terminal B. The electrode terminal B is fixed to the extruded portion or extrusion 6*b* of the band 6 in such a way that a part of it is exposed from the band 6. Further, it is possible to provide a packing in the space between the electrode terminal B and the band 6 so as to achieve water resistance.

When the band 6 is rotated in the direction it is rotated in order to attach it to the wrist or remove it from the wrist, the extrusion 6*b* of the band 6 makes contact with the case 1 and the exposed part of the electrode terminal A fixed to the case 1, while changing the position at which this contact is being made.

When the band 6 is removed from the wrist, a force works in the direction to release the band spring 13, and the band 6 opens up to a predetermined angle. In this state, the electrode terminal B is attached to the extrusion 6*b* of the band 6 in such a way that one tip of the electrode terminal A and one tip of the electrode terminal B make contact with each other. Further, when the band 6 is put onto the wrist the electrode terminal A makes contact with the extrusion 6*b* of the band 6 which is not being contacted by the electrode terminal B. As a result, since it is possible to sever the conduction between the microphone 7 and the circuit block 4, the microphone 7 stops picking up sound and noise stops being generated.

Figure 2:
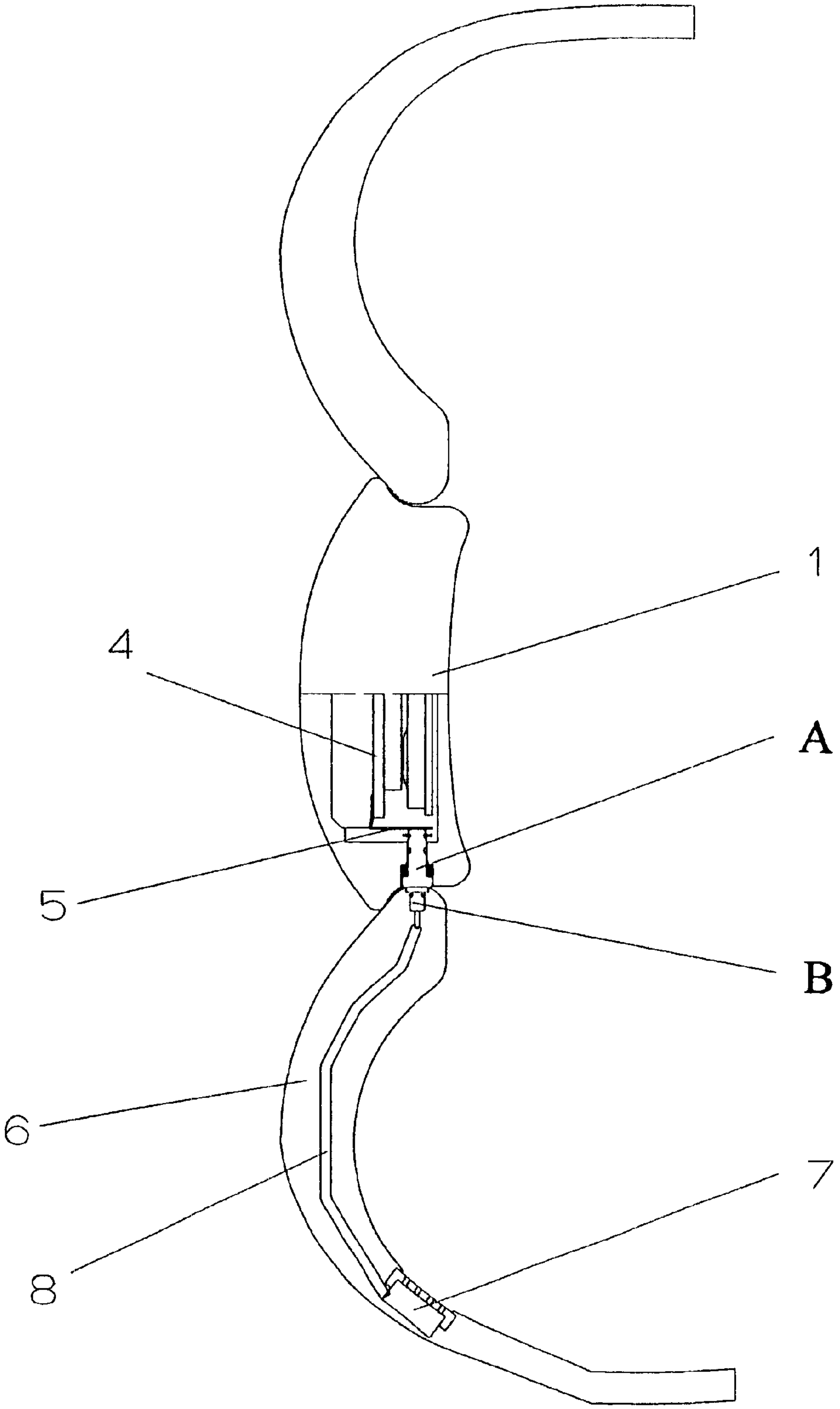
FIG. 2 shows the wrist-carried information device according to the Embodiment of the present invention, and is a partial transparent cross-sectional view depicting a state detached from the wrist.
Figure 3:
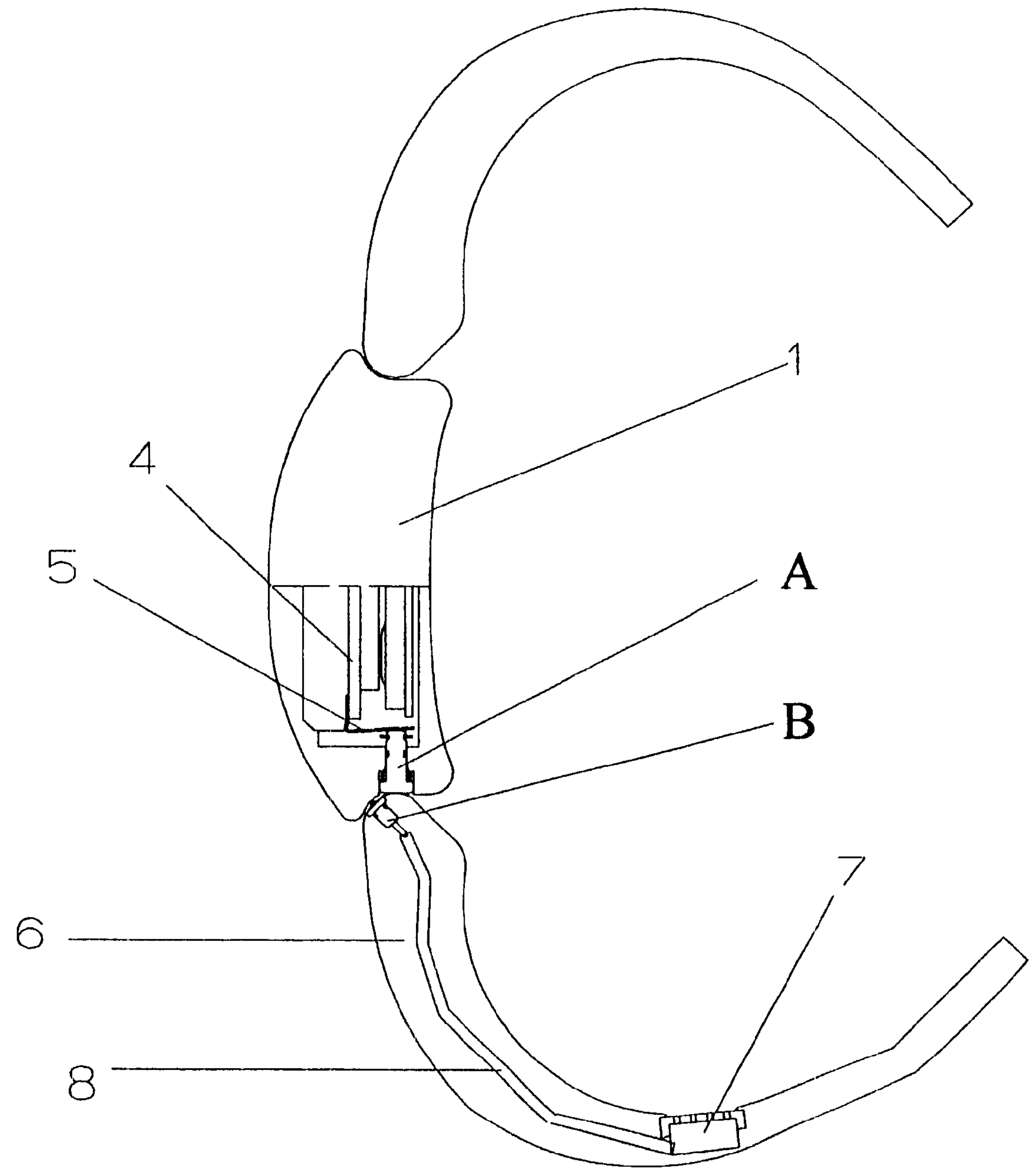
FIG. 3 shows the wrist-carried information device according to the Embodiment of the present invention, and is a partial transparent cross-sectional view depicting a state between FIG. 2 and FIG. 4.
Figure 4:
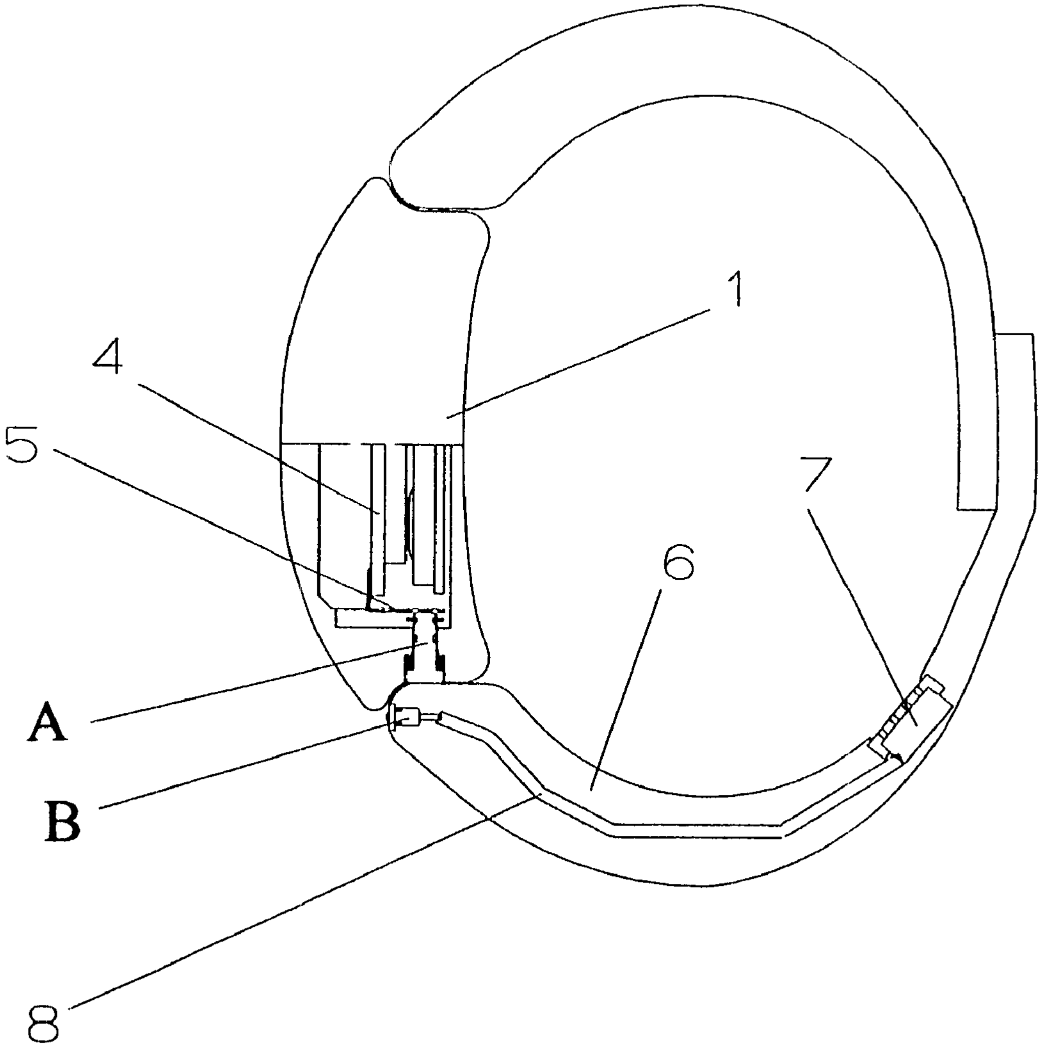
FIG. 4 shows the wrist-carried information device according to the Embodiment of the present invention, and is a partial transparent cross-sectional view depicting the state attached to the wrist.

FIG. 2, FIG. 3 and FIG. 4 are partial transparent cross-sectional views of FIG. 1; and FIG. 2 is of the wrist-carried information device in a state detached from the wrist. FIG. 4 is of the wrist-carried information device in a state attached to the wrist. FIG. 3 is of a state between those of FIG. 2 and FIG. 4.

Figure 5:
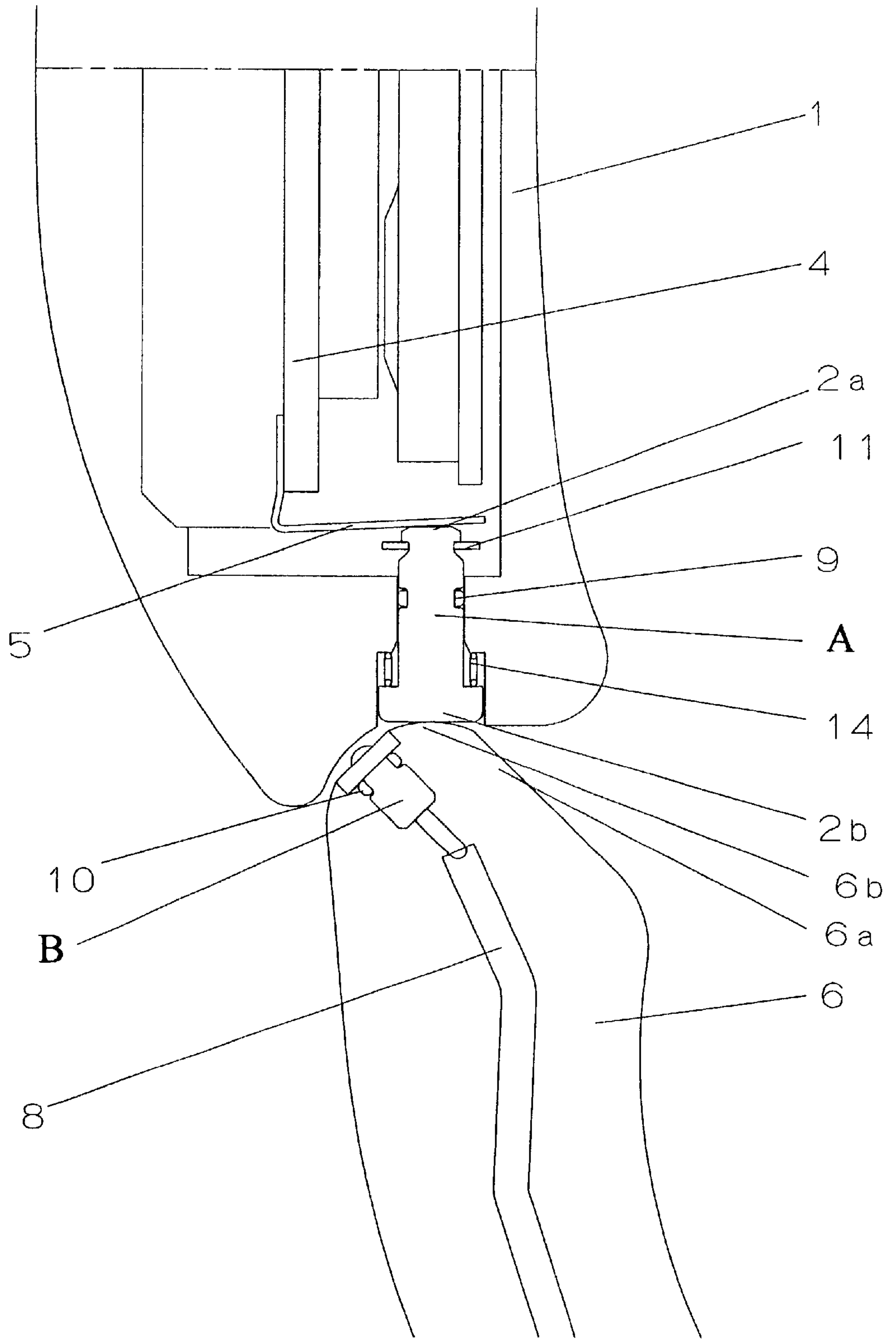
FIG. 5 shows the wrist-carried information device according to the Embodiment of the present invention, and is a partial transparent expanded cross-sectional view depicting the state between FIG. 2 and FIG. 4.

FIG. 5 is an expanded diagram of a band attachment portion of FIG. 3.

Detailed explanation will now be made of a First Embodiment of the present invention in FIG. 1 and FIG. 2, which depict a state of the wrist-carried information device detached from the wrist.

The electrode terminal A is fixed with a terminal stop ring 11 for preventing the electrode terminal A from jumping out from the case, a packing 9 for maintaining water resistance, and a return spring 14 which is constantly engaged with the band 6. Further, the outer side of the case is pressed against a tip portion 2*a* of the electrode terminal A by means of the conductive spring 5 which is joined to the circuit block 4 supported by the case (not shown) by means of a screw or the like.

Note, that the return spring 14 can be omitted depending on the determined spring strength of the conductive spring 5, and it goes without saying that depending on the style of assembly, it is possible to omit the terminal-stopping ring 22 which stops the head portion 2*b* of the electrode terminal A since the head portion 2*b* can be supported by the band.

Further, the engagement of the head portion 2*b* of the electrode terminal A with the electrode terminal B to which there is fixed a packing 10 connecting with the lead line 8 that is connected to the microphone 7, produces the result that transmission of the microphone output is effected between the circuit of the main body of the wrist-carried information device and the band portion.

Next, detailed explanation will be made of the First Embodiment of the present invention as in FIG. 3 and FIG. 5, which depict the wrist-carried information device in an intermediate state between the state of being detached from the wrist and the state of being attached to the wrist.

Rotating the band 6 from the position shown in FIG. 1 and FIG. 2 produces the result that the engagement of the electrode terminal A and the electrode terminal B is broken, which severs the microphone output transmission between the circuit in the main body of the wrist-carried information device and the band portion. Further, when the head portion 2*b* of the electrode terminal A and the extruded portion 6*b* of the band 6 engage with each other, the electrode terminal A is pushed in the direction of the conductive spring 5 to a degree equivalent to the size of the extruded portion.

Detailed explanation will now be made of a First Embodiment as in FIG. 4, which depicts the wrist-carried information device in a state attached to the wrist.

Rotating the band 6 from the position shown in FIG. 3 and FIG. 5 produces the result that the head portion 2*b* of the electrode terminal A and the extruded portion 6*b* of the band 6 are disengaged, and further, the head portion 2*b* of the electrode terminal A and an engagement portion 6*a* of the band 6 are engaged with each other, which makes the electrode terminal A generate a click sensation when it is returned in the opposite direction away from the conductive spring 5.

Figure 6:
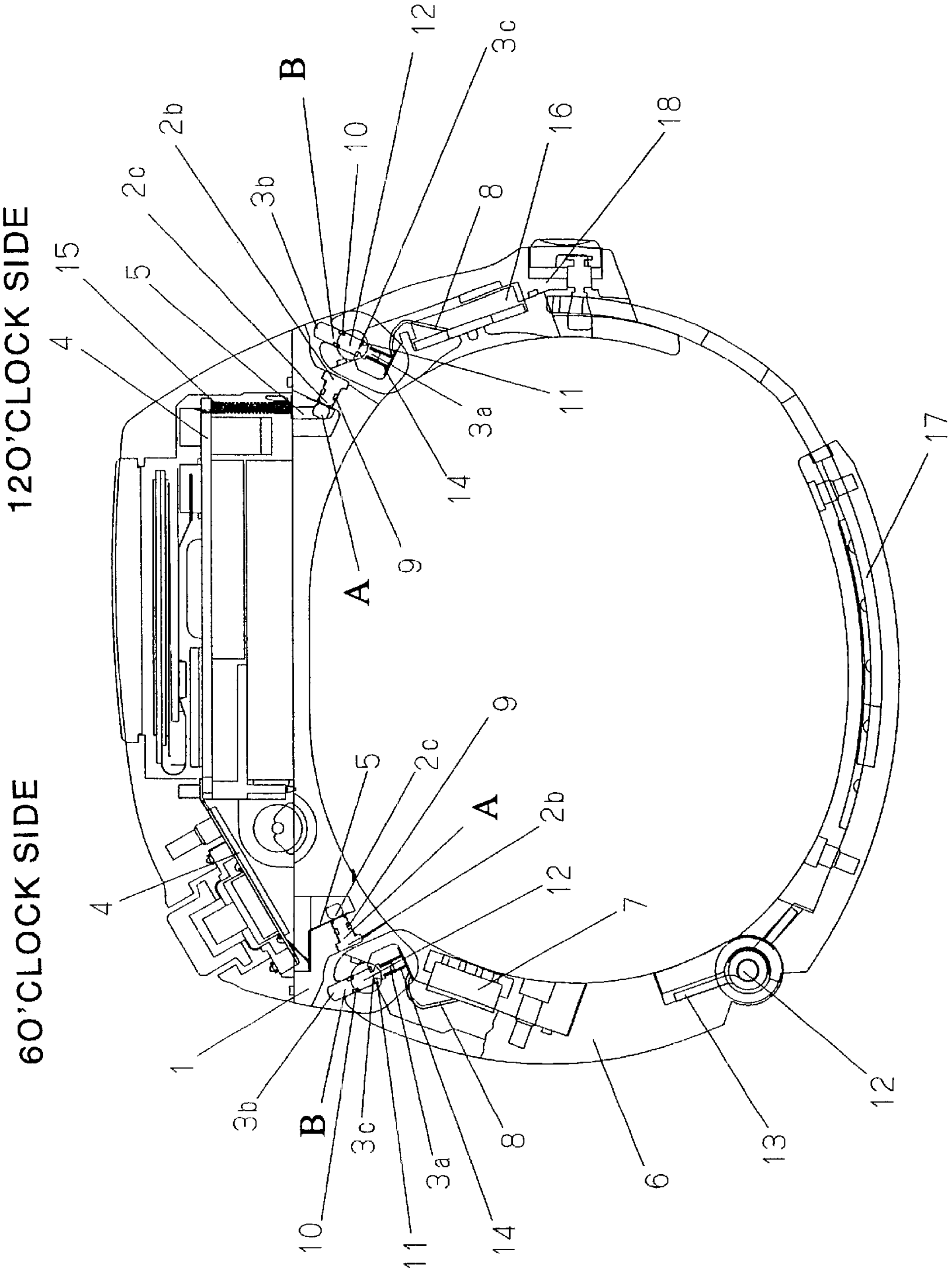
FIG. 6 shows a wrist-carried information device according to another Embodiment of the present invention, and is a transparent cross-sectional view depicting a state attached to the wrist.

FIG. 6 is a transparent cross-sectional view depicting the wrist-carried information device of another Embodiment according to the present invention, in a state attached to the wrist. Reference numeral 1 is a case, and reference numerals 6 and 18 are bands. On the 6 o'clock side of the case 1 (i.e., the side closer to the body when the wrist-carried information device is being worn on the wrist) and on the 12 o'clock side (i.e., the side farther from the body when the wrist-carried information device is being worn on the wrist) there are provided holes for the tip of the spring bar 12 to engage with. The spring bar 12 is inserted into the case 1 and the tip of the spring bar 12 engages with the holes provided to the bands 6 and 18. In this way the bands 6 and 18 can be attached to the case 1 in a rotatable fashion.

Further, a coil-shaped band spring 13 is inserted around the outside of each of the spring bars 12 (not shown), and the tip of the band spring 13 is fixed to the bands 6 and 18 and to the case 1. This band spring 13 is set in such a way that it requires strength to move it in the direction to remove the band 6 and 18.

Further, through holes are opened on the edge surface of the 6 o'clock side of the band 6 for the spring bar 12 to be inserted through. Inserting the spring bar 12 into the edge surface of the 6 o'clock side of the band and making the tip of the spring bar 12 engage also produces the result that the band 6 can be rotatably connected with a band 17.

Further, a coil-shaped band spring 13 is inserted around the outside of the spring bar 12, and the tip of the band spring 13 is fixed to the bands 6 and 17. Further, the tip of the band 17 is inserted so as to be attachable to and detachable from the band 18. Based on the above, the case 1, the band 18, the band 17 and the band 6 are joined to each other in a ring shape. This produces a result that it is easy to remove the bands 6 and 18 from the wrist.

The circuit block 4 for processing the signals from the microphone 7 and a speaker 16 is fixed to the case 1 by means of a screw or the like. The conductive spring 5 and a lead spring 15 are connected to the circuit block 4 in such a way as to be capable of performing conduction. The conductive spring 5 and the lead spring 15 have spring qualities, and the conductive spring 5 is constantly connected with a groove portion 2*c* of the electrode terminal A. A head portion 2*b* of the electrode terminal A is fixed to the case 1 by means of the conductive spring 5 in such a way that it is exposed from the case 1. Further, it is also possible to provide a packing 9 in the space between the electrode terminal A and the case 1 so as to achieve water resistance.

The microphone 7 is buried within the band 6. The microphone 7 is connected to one tip of the lead line 8. The lead line 8 is also buried inside the band 6. The other tip of the lead line 8 is connected to a terminal-returning spring 14. The other tip of the terminal-returning spring 14 connects to a terminal tip portion 3*a* of the electrode terminal B. The electrode terminal B is supported by the band in such a way that a terminal head portion 3*b* is exposed from the band 6, and also, the electrode terminal B is pressed against the outer side of the band due to the working of the terminal-returning spring 14.

Further, it is possible to provide a packing 10 in the space between the electrode terminal 3 and the band 6 so as to achieve water resistance.

The speaker 16 is buried into the band 18. The speaker 16 is connected to one tip of the lead line 8. The lead line 8 is also buried into the band 18. The other tip of the lead line 8 is connected to terminal-returning spring 14. The other tip of the terminal-returning spring 14 connects to the terminal tip portion 3*a* of the electrode terminal B. The electrode terminal B is supported by the band in such a way that the terminal head portion 3*b* is exposed from the band 18, and also, the electrode terminal B is pressed against the outer side of the band due to the working of the terminal-returning spring 14.

Further, it is possible to provide a packing 10 in the space between the electrode terminal B and the band 18 so as to achieve water resistance.

When the band 6 is rotated in the direction to attach it to the wrist or remove it from the wrist, the terminal head portion 3*b* of the electrode terminal B extruding from the band 6 makes contact with the head portion 2*b*, which is the exposed part of the electrode terminal A attached to the case 1, and while making this contact it changes position at which the contact is being made.

When the band 6 is removed from the wrist, force works in the direction release the band spring 13, and the band 6 opens up to until a point where a back portion 6*c* of the band 6 opens up to until a point where a back portion 6*c* of the band 6 and an angle-determining portion 1*a* of the case bump into each other. In this state, the electrode terminal B is attached to the band 6 in such a way that one tip of the electrode terminal A and one tip of the electrode terminal B make contact with each other.

Further, when the band 6 is put onto the wrist, contact between the electrode terminal A and the electrode terminal B is released. As a result, it is possible to sever the conduction between the microphone 7 and the circuit block 4, so the microphone 7 stops picking up sound and noise stops being generated.

When the band 18 is rotated in the direction to attach it to the wrist or remove it from the wrist, the terminal head portion 3*b* of the electrode terminal B extruding from the band 18 makes contact with the head portion 2*b*, which is the exposed part of the electrode terminal A attached to the case 1, and while making this contact it changes the position at which the contact is being made.

When the band 18 is removed from the wrist, force works in the direction to release the band spring 13, and the band 18 opens up to a point where a back portion 18*a* of the band 18 and an angle-determining portion 1*a* of the case bump into each other. In this state, the electrode terminal B is fixed to the band 18 in such a way that one tip of the electrode terminal A and one tip of the electrode terminal B make contact with each other.

Further, when the band 6 is put onto the wrist, contact between the electrode terminal A and the electrode terminal B is released. As a result, it is possible to sever the conduction between the speaker 16 and the circuit block 4, so the speaker 16 stops emitting sound and noise stops being generated.

Figure 7:
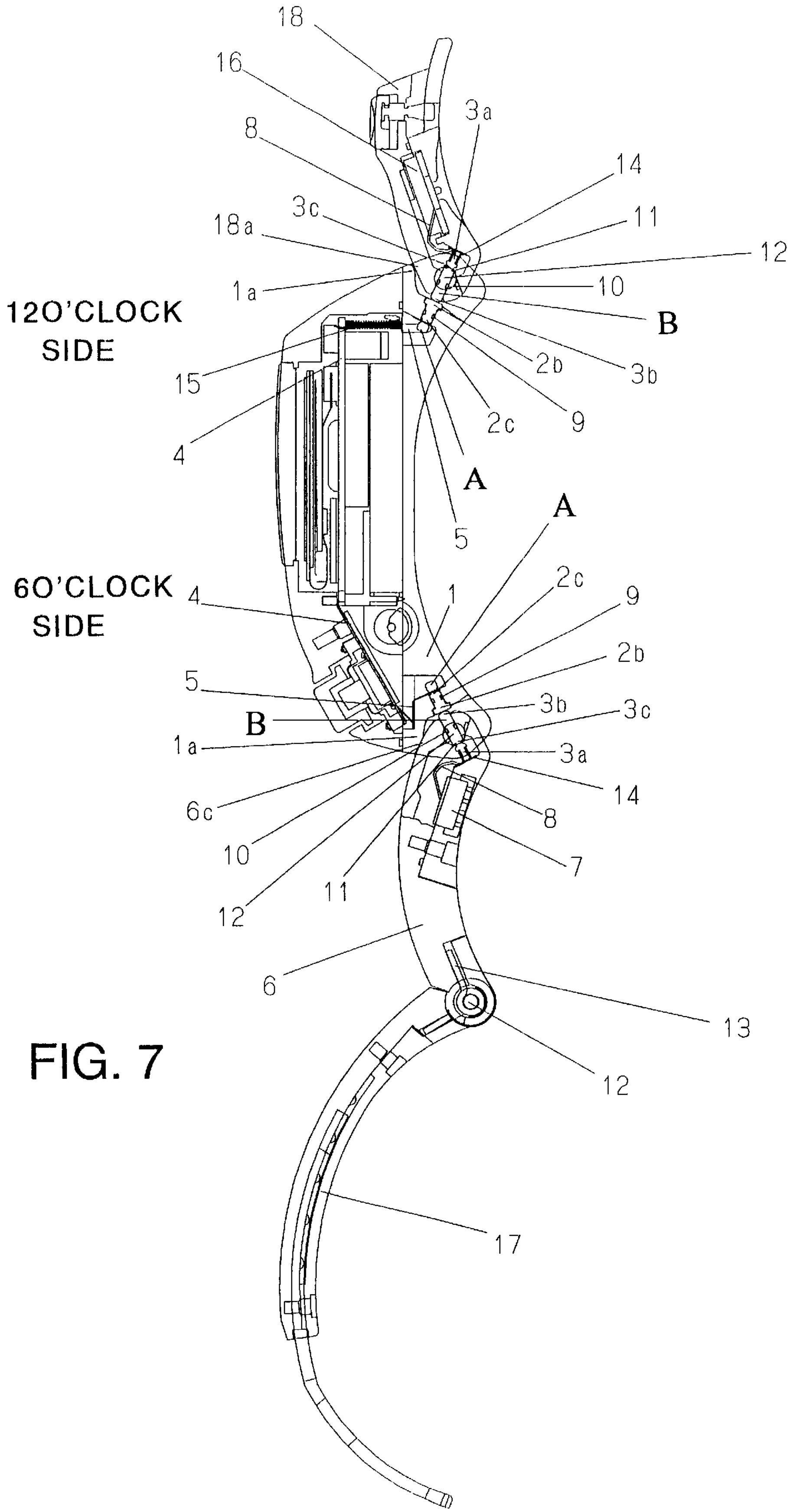
FIG. 7 shows the wrist-carried information device according to another Embodiment of the present invention, and is a partial transparent cross-sectional view depicting a state detached from the wrist.
Figure 8:
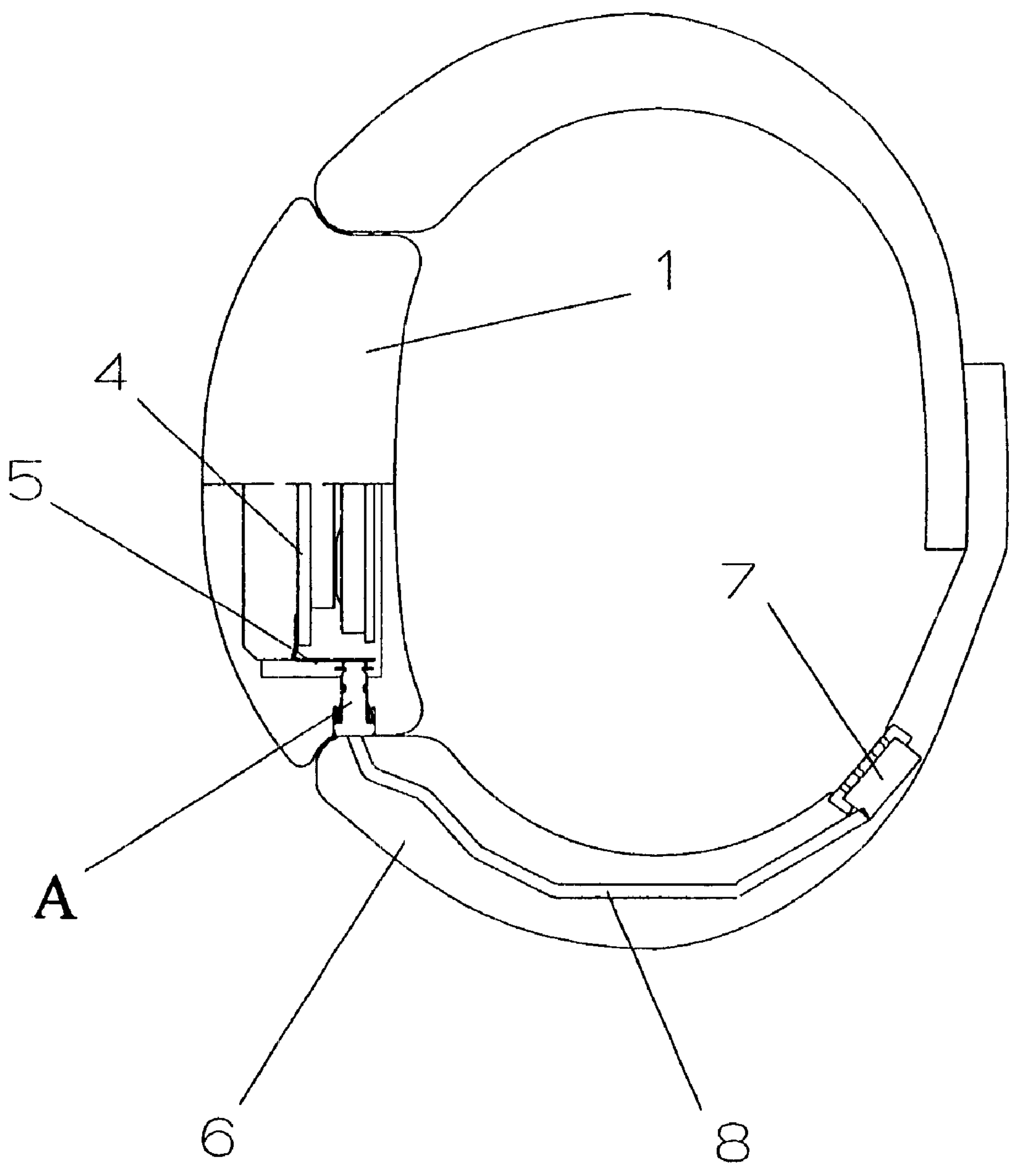
PRIOR ART FIG. 8
FIG. 8 is an example of a convention al wrist-carried information device, and is a partial transparent cross-sectional view depicting the state attached to the wrist.

FIG. 7 depicts the wrist-carried information device in a state detached from the wrist. The electrode terminal A engages the groove portion 2*c* with the conductive spring 5 which prevents jumping out from the case, and the packing which achieves the water resistance and the terminal-returning spring 14 which constantly engages with the band 6 are fixed to the electrode terminal A. The conductive spring 5 is connected by means of a screw or the like to the circuit block 4 that is supported by the case.

Further, the conductive spring 5 on the 12 o'clock side is connected by means of a screw or the like through the lead spring 15 to the circuit block 4 which is supported by the case. The electrode terminal B pinches the terminal-stopping ring 11 to the terminal groove portion 3*c* that prevents jumping out from the band. As a result of this, the packing 10 that achieves the water resistance and the terminal-returning spring 14 for engaging with the electrode terminal A are fixed.

Further, engagement of the terminal head portion 2*b* of the electrode terminal A with the terminal head portion 3*b* of the electrode terminal B to which there is fixed the packing 10 which is connected through the terminal-returning spring 14 to the lead line 8 leading to the microphone 7, produces the result that the microphone output is transmitted between the circuit in the main body of the wrist-carried information device and the band portion.

Further, the head portion 2*b* of the electrode terminal A on the 12 o'clock side engages with the terminal head portion 3*b* of the electrode terminal B. The packing 10 is fixed to the terminal head portion 3*b* of the electrode terminal B. The packing 10 is connected to the lead line 8 that is connected to the speaker 16 through the terminal-returning spring 14. This produces the result that the speaker output is transmitted from the circuit of the main body of the wrist-carried information device to the speaker portion.

When the band is in the open state, the tips of each of the bands are opened at an angle of approximately 10 degrees above or below a reference point of the bottom face of the case. As a result it is easy to speak. Note, however, that when the case is in a curved shape the reference point is a protrusion, a surface, or such which is provided to the wrist-carried information device in order to make it stable when it is set upon a flat surface.

As explained above, in the present invention, the microphone and speaker output transmission between the circuit of the wrist-carried information device main body and the band portion only becomes conductive when the wrist-carried information device is in the state detached from the wrist; therefore, when the wrist-carried information device is attached to or removed from the wrist the lead line is not broken because it does not stretch. Further, noise that occurs at the time of attaching or detaching the device is not picked up.

Further, ease of removal when a call is received is achieved by the combination of the click sensation when the wrist-carried information device is removed from the wrist for use, together with the band spring which applies force in the direction to remove the band.

The packing is provided to the electrode terminal so as to achieve water resistance.

What is claimed is:

1. A wrist-carried information device comprising: a case; a circuit block disposed in the case; a first electrode terminal disposed in the case and electrically connected to the circuit block; a band pivotally connected to the case for undergoing pivotal movement within a range of angular positions relative to the case; and a second electrode terminal disposed in the band for contacting the first electrode terminal in accordance with a relative angular position between the band and the case.

2. A wrist-carried information device according to claim 1; further comprising a shaft having a longitudinal axis about which the band undergoes pivotal movement relative to the case.

3. A wrist-carried information device according to claim 1; wherein the first electrode terminal has a contact portion arranged in the vicinity of an outer surface of the case; and wherein the second electrode terminal has a contact portion arranged in the vicinity of an outer surface of the band for contacting the contact portion of the first electrode terminal in accordance with the relative angular position between the band and the case.

4. A wrist-carried information device according to claim 1; further comprising a biasing member for supporting the first electrode terminal in the case.

5. A wrist-carried information device according to claim 1; wherein the band has at least two portions each having a terminal end for detachable connection to one another to allow closing of the band when the wrist-carried information device is worn on a user's wrist and to allow opening of the band when the wrist-carried information device is removed from the user's wrist; and wherein the first electrode terminal is disposed in contact with the second electrode terminal when the band is opened and the first electrode terminal is not disposed in contact with the second electrode terminal when the band is closed.

6. A wrist-carried information device according to claim 1; further comprising a shaft having a longitudinal axis about which the band undergoes pivotal movement relative to the case to allow closing of the band when the wrist-carried information device is worn on a user's wrist and to allow opening of the band when the wrist-carried information device is removed from the user's wrist.

7. A wrist-carried information device according to claim 6; further comprising a biasing member mounted around the shaft for biasing the band in a direction to open the band to a preselected angular position relative to the case.

8. A wrist-carried information device according to claim 7; wherein the first electrode terminal is disposed in contact with the second electrode terminal at the preselected angular position.

9. A wrist-carried information device according to claim 1; further comprising a waterproof element disposed between the first electrode terminal and the case.

10. A wrist-carried information device according to claim 1; wherein the band has an extruded portion for contacting the case during pivotal movement of the band relative to the case.

11. A wrist-carried information device according to claim 1; further comprising a conductive spring element connected to the circuit block and disposed in pressure contact with the first electrode terminal to electrically connect the first electrode terminal to the circuit block.

12. An information device to be worn on the wrist of a user, the information device comprising: a case having a circuit block and a first electrode terminal electrically connected to the circuit block, the first electrode terminal having a contact portion arranged in the vicinity of an outer surface of the case; and a wristband mounted for undergoing pivotal movement within a range of angular positions relative to the case, the wristband having a second electrode terminal having a contact portion arranged in the vicinity of an outer surface of the wristband for contacting the contact portion of the first electrode terminal in a preselected angular position of the wristband relative to the case.

13. An information device according to claim 12; further comprising a biasing member for supporting the first electrode terminal in the case.

14. An information device according to claim 12; wherein the wristband has at least two portions each having a terminal end for detachable connection to one another to allow closing of the wristband when the information device is worn on a user's wrist and to allow opening of the wristband when the information device is removed from the user's wrist; and wherein the contact portion of the first electrode terminal is disposed in contact with the contact portion of the second electrode terminal when the wristband is opened and the contact portion of the first electrode terminal is not disposed in contact with the contact portion of the second electrode terminal when the wristband is closed.

15. An information device according to claim 12; further comprising a shaft having a longitudinal axis about which the wristband undergoes pivotal movement relative to the case to allow closing of the wristband when the information device is worn on a user's wrist and to allow opening of the wristband when the information device is removed from the user's wrist.

16. An information device according to claim 15; further comprising a biasing member mounted around the shaft for biasing the wristband in a direction to open the wristband to a preselected angular position relative to the case.

17. An information device according to claim 16; wherein the contact portion of the first electrode terminal is disposed in contact with the contact portion of the second electrode terminal at the preselected angular position.

18. An information device according to claim 12; further comprising a waterproof element disposed between the first electrode terminal and the case.

19. An information device according to claim 12; wherein the wristband has an extruded portion for contacting the case during pivotal movement of the wristband relative to the case.

20. An information device according to claim 12; further comprising a conductive spring element connected to the circuit block and disposed in pressure contact with the first electrode terminal to electrically connect the first electrode terminal to the circuit block.

21. An information device to be worn on the wrist of the user, the information device comprising: a case having a circuit block and a pair of first electrode terminals electrically connected to the circuit block; and a wristband mounted for undergoing pivotal movement within a range of angular positions relative to the case, the wristband having a pair of second electrode terminals each for contacting a respective one of the first electrode terminals of the case in a preselected angular position of the wristband relative to the case.

22. An information device according to claim 21; further comprising a pair of biasing members each for supporting a respective one of the first electrode terminals in the case.

23. An information device according to claim 21; further comprising a pair of conductive spring elements each connected to the circuit block and disposed in pressure contact with a respective one of the first electrode terminals to electrically connect the first electrode terminals to the circuit block.

* * * * *